United States Patent [19]

Loustau et al.

[11] Patent Number: 5,762,327
[45] Date of Patent: Jun. 9, 1998

[54] DEVICE TO FACILITATE THE MAKING OF OPTICAL FIBER CONNECTIONS

[75] Inventors: Christian Loustau, Montrouge; Albert Chan Kui Cheong, Bagneux; Fabrice Laine, Le Kremlin Bicêtre; Raymond Joubert, Paris, all of France

[73] Assignee: France Telecom, Paris, France

[21] Appl. No.: 729,785

[22] Filed: Oct. 8, 1996

[30] Foreign Application Priority Data

Oct. 9, 1995 [FR] France ................... 95 11878

[51] Int. Cl.⁶ ........................................... B25B 1/22
[52] U.S. Cl. .................. 269/71; 269/79; 269/76; 269/103; 269/149; 269/907
[58] Field of Search ........................ 269/71, 72, 55, 269/76, 103, 149, 909, 907

[56] References Cited

U.S. PATENT DOCUMENTS

| | | | |
|---|---|---|---|
| 2,635,495 | 4/1953 | Thompson | 269/72 |
| 4,008,948 | 2/1977 | Dalgleish et al. | 350/96 C |
| 4,135,782 | 1/1979 | Beauhaire | 350/96.21 |
| 4,322,065 | 3/1982 | Doiron | 269/907 |
| 4,426,055 | 1/1984 | Reedy et al. | 248/184 |
| 4,673,245 | 6/1987 | Kling et al. | 350/96.2 |
| 5,165,673 | 11/1992 | Newton, Jr. | 269/71 |
| 5,169,079 | 12/1992 | Renzetti | 242/7.19 |
| 5,280,892 | 1/1994 | Smith | 269/45 |

FOREIGN PATENT DOCUMENTS 0 104 513   4/1984   European Pat. Off. .

Primary Examiner—James G. Smith
Assistant Examiner—Lee Wilson
Attorney, Agent, or Firm—Nilles & Nilles, S.C.

[57] ABSTRACT

A device used to facilitate the making of the connection system of an optical fiber comprises: an upright that supports the gripping of the joining piece associated with holding the connectors in an immobile state with respect to the joining piece during the front polymerization of the connection system; this upright also supporting a fastening system used to hold the connector in an immobile state during the rear polymerization of the connection system and an adjuster capable of causing the pivoting and translation of the joining piece so that it surrounds the solder point located in the rear of the connector, held in an immobile state by the fastening system, to achieve the rear polymerization of the connection system. The device is very useful especially in the field of telecommunications by optical fibers.

19 Claims, 4 Drawing Sheets

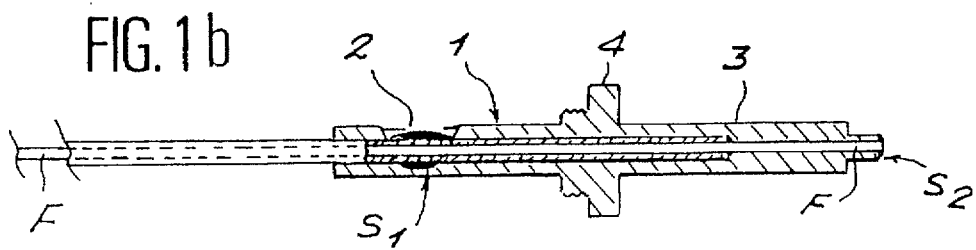
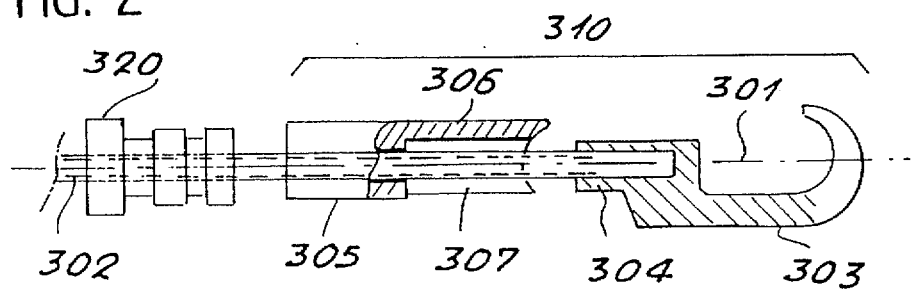
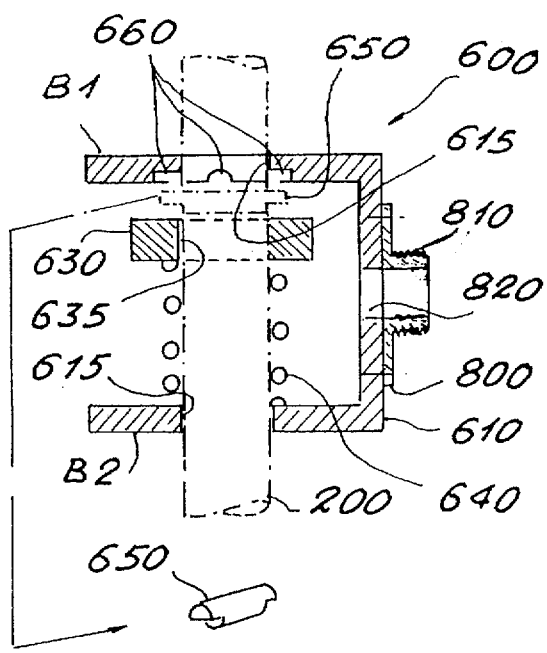
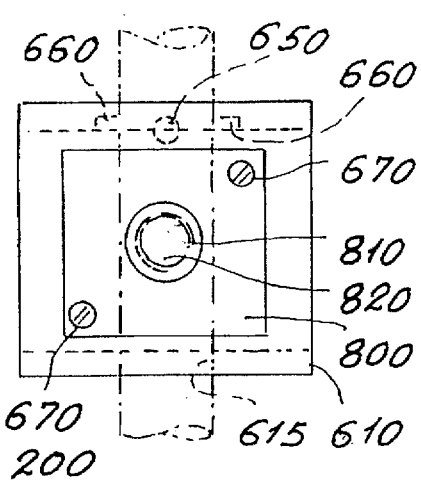
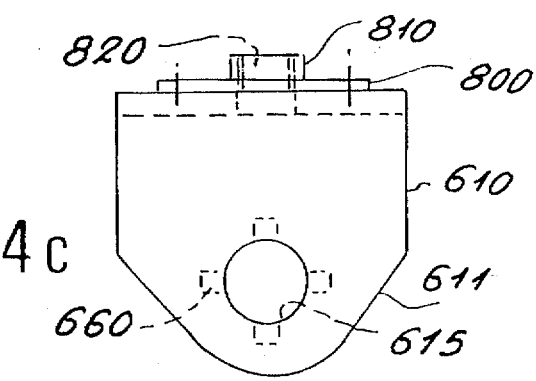

DEVICE TO FACILITATE THE MAKING OF OPTICAL FIBER CONNECTIONS

BACKGROUND OF THE INVENTION

1. Field of the Invention

The invention relates to a device that can be used to facilitate the making of optical fiber connections. A device of this kind is very useful for making connections between optical fibers or between optical fibers and one or more measuring instruments, especially in the field of telecommunications by optical fibers.

The connection system of an optical fiber is defined as being a fiber to the ends of which there are attached connectors enabling it to be connected to another optical fiber or any measuring instrument or, again, a light source. The connection system can therefore be used to let light pass through connectors, from one fiber to another for example.

The making of a connection system consists of the polymerization, in two steps, of a resin applied to two solder spots located on the front and rear of a connector placed on an optical fiber. The polymerization of this resin is done by means of light coming from a light source and going through a flexible light guide, to which a joining piece is connected. This joining piece enables the surrounding of the solder spot located behind the connector, during the step for the rear polymerization of the connection system. Furthermore, it has a hole capable of receiving the front of the connector, during the step for the front polymerization of the connection system.

2. Description of the Prior Art

There are several sorts of connectors for optical fibers: the most common ones in the field of telecommunications are the VFO and EC connectors commercially distributed by the firm Radiall and the connectors NTT-FC and ATT-ST supplied by many firms.

The making of a connection system, however, is a painstaking process requiring great precision. Indeed, it is very important to hold the connector in an immobile state with respect to the joining piece throughout all operations so as to obtain an even polymerization of the solder spots located on either side of the connector and consequently a high quality connection system.

At present, the connection systems of optical fibers are still being done by hand. Thus, throughout the polymerization steps, namely for several minutes, for each step, an operator has to fixedly hold the joining piece of the light guide and the assembly consisting of the connector and the optical fiber.

Holding the joining piece of the light guide and the connector in one's hands throughout the period of the making of a connection system is not a reliable technique. Indeed, a shift, even a tiny shift, of the joining piece and/or of the connector causes cases of uneven polymerization with resultant degradation of the quality of the connection system thus made.

Furthermore, since the quality of the connection systems made depends entirely on the way in which the operator has held the joining piece and the connector during the polymerization operations, it is highly variable and is in no circumstance reproducible.

Finally this manufacturing technique requires extremely lengthy manufacturing times and does not enable work on several connectors simultaneously, with a view to making several connection systems.

SUMMARY OF THE INVENTION

The present invention therefore proposes a device by which all of the above-mentioned drawbacks can be overcome. It makes it possible to fixedly hold the joining piece of the light guide and the connector at the same time, and to free the operator's hands.

An object of the invention therefore pertains to a device used to facilitate the making of the connection system of an optical fiber by the polymerization, in two steps, of a resin applied to two solder spots located on the front and rear of a connector placed on the optical fiber, by means of a light coming from a light source and going through a flexible light guide, to which there is connected a joining piece capable of surrounding the solder spot located in the rear of the connector, to carry out the rear polymerization of the connector, and comprising a hole capable of receiving the front of the connector, to carry out a front polymerization of the connection system wherein said device comprises: an upright that supports means for the gripping of the joining piece associated with holding means used to hold the connectors in an immobile state with respect to the joining piece during the front polymerization of the connection system; this upright also supporting a fastening system used to hold the connector in an immobile state during the rear polymerization of the connection system and adjustment means capable of causing the pivoting and translation of the joining piece so that it surrounds the solder point located in the rear of the connector, held in an immobile state by the fastening system, to achieve the rear polymerization of the connection system.

This device is inexpensive and can be used to solidly hold both the joining piece of the light guide and a connector during the stages of polymerization, so much so that it can be used to work on several connectors simultaneously. Indeed, during the front or rear polymerization of a first connector system, the operator has his hands free and can therefore prepare a second connection system by placing a connector on an optical fiber and applying the resin to be polymerized to the solder spots located on the fiber and on either side of the connector. Consequently, the time taken to make a connection system is considerably reduced.

Furthermore, through this device, the joining piece of the light guide and the connector are held in a perfectly immobile state during the stages of polymerization so much so that the quality of the connection systems made is very good and perfectly reproducible.

BRIEF DESCRIPTION OF THE DRAWINGS

Other features and advantages of the invention shall appear from the following description given by way of a non-restrictive illustration with reference to the appended figures, of which:

FIG. 1b shows a longitudinal sectional view of a connector connected to an optical fiber, FIG. 2 shows an exploded view of means for fixing the device of FIG. 1a, FIG. 3 shows a longitudinal sectional view of an assembly consisting of adjustment means and means for the gripping of the device of FIG. 1a, FIG. 4a shows a view in profile of a swivelling support to the device of FIG. 1a, FIG. 4b shows a front view of the swivelling support of FIG. 4a, FIG. 4c shows a top view of the swivelling support of FIG. 4a, FIG. 5 shows a view in perspective of another embodiment of a device according to the invention.

MORE DETAILED DESCRIPTION

Figure 1A:
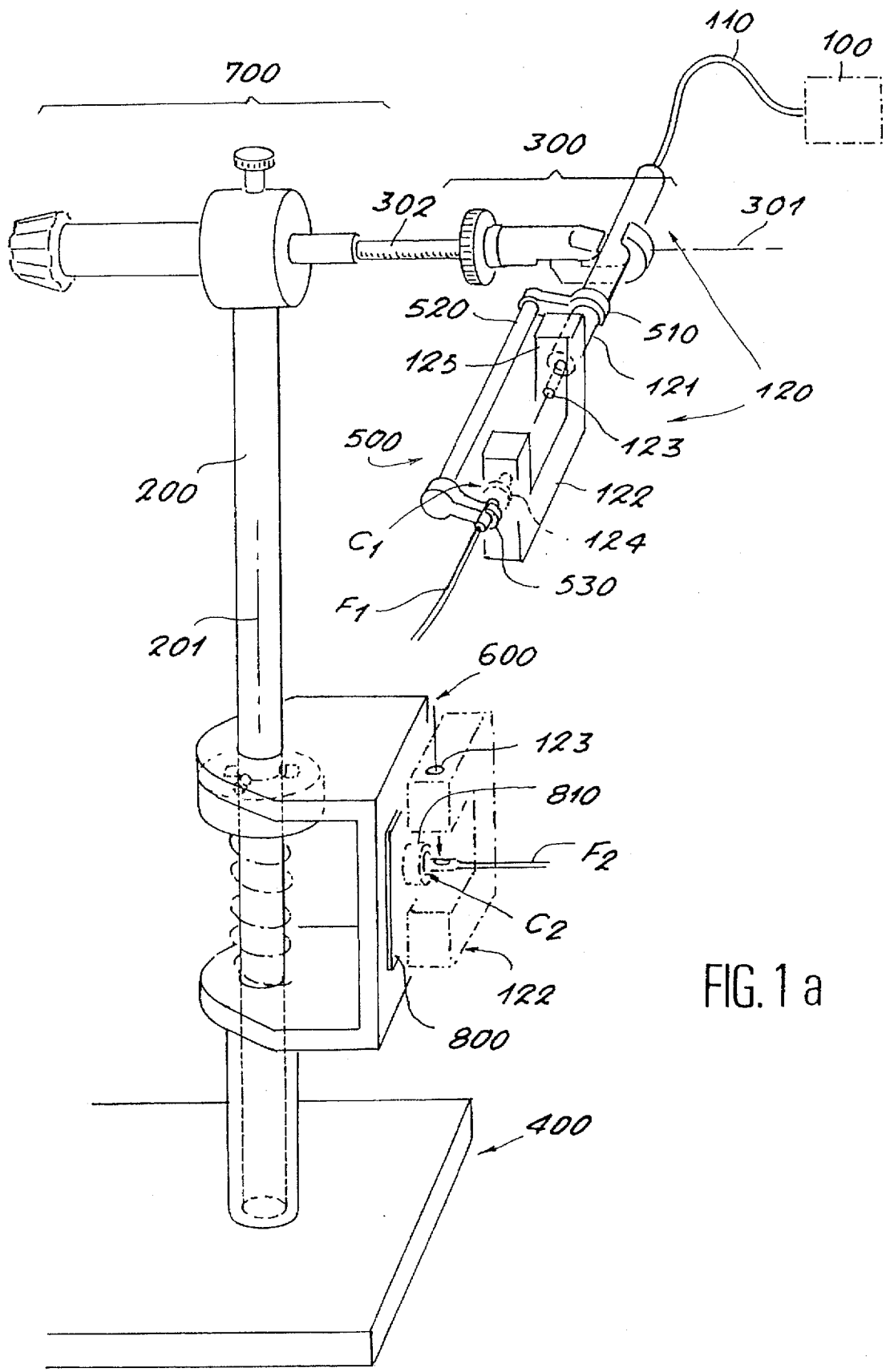
FIG. 1a shows a view in perspective of a device according to the invention.

An embodiment of a device according to the invention will be understood more clearly with reference to FIG. 1a. A device of this kind has an upright 200 that is stabilized by a horizontal plate 400 to which it is fixed by screwing, bonding or soldering for example, as illustrated in FIG. 1a. According to a variant, it may be held stable by means of legs for example.

The device further has a mechanism 300 for gripping a joining piece 120 of a light guide 110; a holder 500 that can be used to hold a connector C1 in an immobile state with respect to the joining piece 120 and a fastening system 800 capable of holding a connector C2 in an immobile state during the rear polymerization of the connection system. Finally, an adjustment mechanism 700 is also planned to enable a pivoting and translation of the joining piece 120 so that this joining piece surrounds the solder point located in the rear of the connector C2, held in an immobile state by the fastening system 800, to carry out the rear polymerization of the connection system.

Advantageously, the mechanism 300 for gripping the joining piece 120 and the adjustment mechanism 700 are located in the top part of the upright 200 and borne by a threaded rod 302 whose axis 301 is perpendicular to the longitudinal axis 201 of the upright 200.

Furthermore, there is a support 600 in the median part of the longitudinal axis 201 of the upright 200. This support 600 is used to bear the fastening system 800. Advantageously, the support 600 is a swivelling support, i.e.) it can rotate about the longitudinal axis 201 of the upright 200 so that it can be made easier for an operator to carry out handling operations according to whether he is right-handed or left-handed.

FIG. 1a illustrates the way in which the joining piece 120 is held in an immobile state during the front polymerization of a connection system.

To carry out a polymerization of this kind, a rigid tube 121 of the joining piece 120 is held by the gripping mechanism 300, the working of which is explained hereinafter. The gripping mechanism 300 is then blocked in translation and in rotation about the axis 301 of the threaded rod 302 that supports them, using adjustment means 700, the working of which is explained here below. Advantageously, the gripping mechanism 300 is blocked so that the joining piece 120 is in the horizontal position.

The front of a connector $C_1$ is fixed beforehand to an optical fiber $F_1$. The solder spot of this optic fiber $F_1$, located on the front, has been resin-treated. This optic fiber $F_1$ is then placed in an hole 124 provided at one end of a head 122 of the joining piece 120. This end is defined as being the face opposite to the one bearing the tube 121 of the joining piece 120. Furthermore, the head 122 of the joining piece is provided with a small hole 123. This small hole 123 is made on the face 125, of the head 122 of the joining piece, that bears the tube 121. This small hole 123 lets through the light coming from a light source 100 and crossing a light guide 110 to which there is connected the joining piece 120. The light thus reaches the front face of the connector $C_1$, as illustrated by the little arrows in FIG. 1a, to polymerize the resin applied to the front solder spot.

To achieve the efficient polymerization of the front of the connection system, it is preferable to hold the connector $C_1$ in an immobile state with respect to the joining piece 120. For this purpose, the holding mechanism 500 advantageously comprises a jaw 510 placed at the end of a rigid rod 520 and a hook 530 placed at the other end of the rod 520. The jaw 510 is used to grip the tube 121 of the joining piece 120 while the hook 530 is used to support the connector C1 and secure its positioning during the front polymerization phase.

To carry out a rear polymerization, the gripping mechanism 300 is then rotated by 45° around the axis 301 of the threaded rod 302 and translated along the axis 301. A motion of this kind of the gripping mechanism 300 is achieved by the adjustment mechanism 700. Thus, the joining piece 120 is fixed vertically and in such a way that its head 122 surrounds the rear face of a connector $C_2$ fastened to the fastening system 800 of the support 600 and bearing a fiber 72. The position of the head 122 of the joining piece 120, during the rear polymerization of the connection system, is illustrated in FIG. 1a.

The connector $C_2$ is fixed so that the resin-treated surface, to be polymerized, of the rear solder spot is oriented upwards, namely in a position where it faces the light falling on the head 122 of the joining piece 120 through the hole 123 that faces the solder spot. The path of the light by which the rear polymerization is achieved is represented by an arrow in FIG. 1a.

The fastening system 800 preferably has a screw thread 810 to which the connector $C_2$ gets screwed. Thus, the fastening system 800 can quite simply be a cross-piece for example, adapted to the type of connector used to make the connection system and generally enabling the connection between the optical fibers by placing two connectors face to face. However, one variant consists in choosing a fastening system comprising at least one clip for example.

An exemplary connector of the VFO type commercially distributed by the firm Radiall is shown in FIG. 1b. The rear face 1 of the connector has a hole 2 at the bottom of which the rear solder spot $S_1$ is made by the polymerization of a resin applied to the sheath surrounding the optical fiber F. Furthermore, the part of the optical fiber F located inside the front face 3 of the connector is bared.

The front solder spot $S_2$ is made on the bared fiber F just at the outlet of the front face 3 of the connector C. A screw 4, placed between the front face 3 and the rear face 1, enables the connector to be screwed on to adapters or to the cross-pieces enabling the connection of two optical fibers to each other for example or again on to the fastening system 800 provided on the device according to the invention to hold a connector in an immobile state during the rear polymerization of a connection system.

FIG. 2 gives a more detailed view of the gripping mechanism 300 and provides for a clearer understanding of its operation. These means comprise a jaw 310 capable of receiving the joining piece 120 of the light guide.

This jaw 310 consists firstly of a hook 303 fitted out with a small threaded tube 304 enabling it to be fixed to the threaded rod 302 and secondly a sliding tube 305 fixedly joined to a knob 320 mounted on the threaded rod 302. This sliding tube 305 has a diameter greater than that of the small threaded tube 304 so as to receive it without any difficulty.

The sliding tube 305 is used to adjust the width of the jaw 310 so that it grips the tube 121 of the joining piece 120 of the light guide 110 to hold it solidly. Indeed, the knob 320 can be used not only to push the sliding tube 305 to bring this tube closer to the hook 303 but also to move itself away from the tube in order to be able to move the tube away from the hook 303. Consequently, this system enables the easy closing and opening of the jaw 310 so that joining pieces of substantially different thicknesses can be placed therein.

The upper part of the sliding tube that enables the gripping, in combination with the hook 303, of the tube 121 of the joining piece 120 preferably has a slight protuberance 306 in order to increase the reliability of the gripping by the jaw 310.

Furthermore, so that it can easily slide along the threaded rod 302 without being hampered by the hook 303, the tube 305 has a hollow 307.

Finally, owing to the fact that the hook 303 is fixed to the threaded rod 302 by means of a threaded tube 304, it is possible to adjust the length of the axis 301 of this threaded rod 302 supporting the gripping mechanism 300. Indeed, the tube 304 has a certain length enabling the length of the axis 301 to be substantially varied by the screwing of this tube 304 on to the threaded rod 302 or the unscrewing of the tube therefrom. This adjustment of length is very important for the rear polymerization step since the head 122 of the joining piece 120 must be positioned so that it surrounds the rear solder spot of the connector and so that the hole 123, through which the light beam falls, is located just above the rear solder spot.

Figure 3:
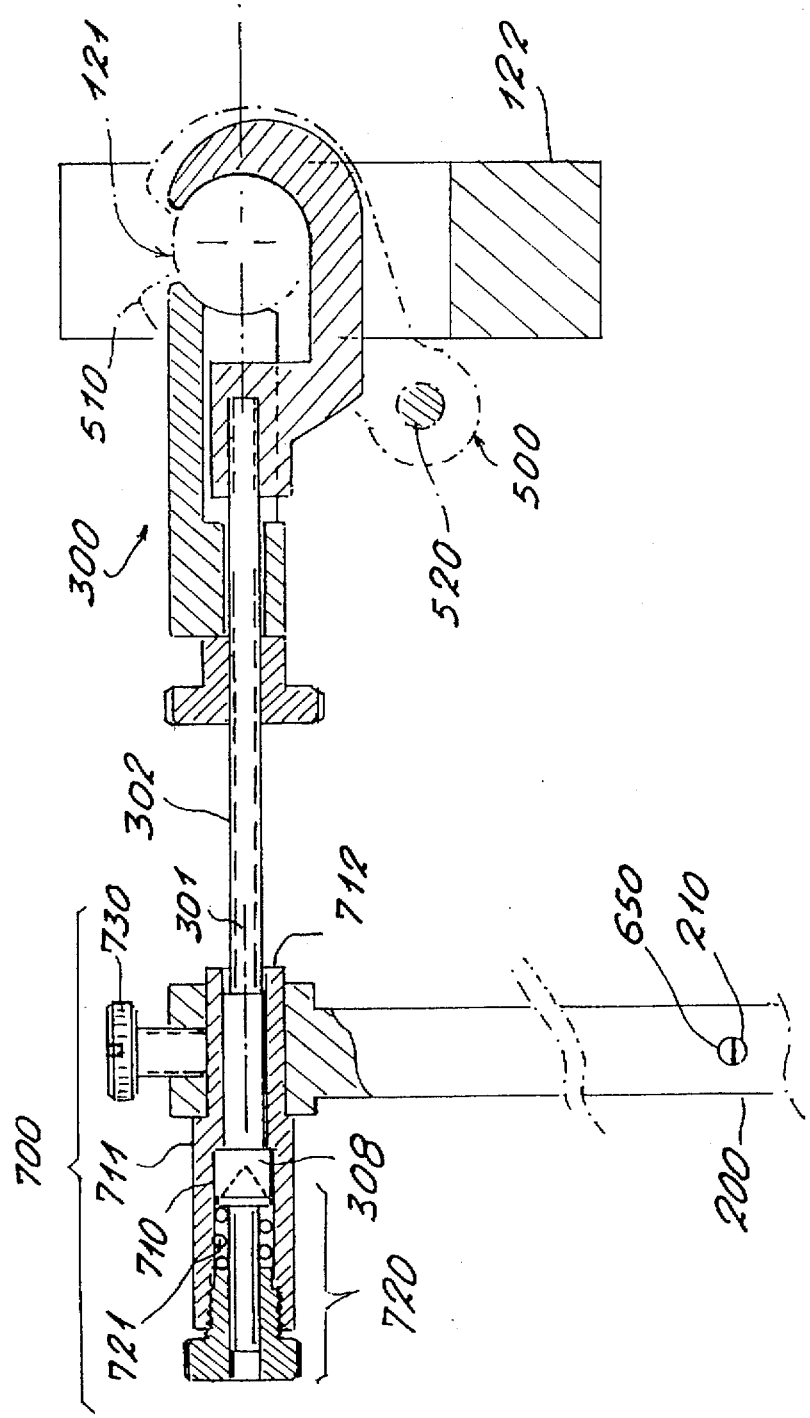

The adjustment mechanism 700 is shown in a longitudinal section, with the previously described gripping mechanism 300, in FIG. 3. Thus like the gripping mechanism 300, these adjustment means are supported by the threaded rod 302.

The adjustment mechanism 700 comprises a sleeve 710, a first cone point set screw 720 and a second cone point set screw 730. The sleeve 710 is divided into two parts 711 and 712. Advantageously, the first part 711 is threaded and has a diameter greater than that of the second part 712. The threaded rod 302 is placed in the second part 712 having a smaller diameter. Preferably, a shim 308 is fixed to the end of the threaded rod 302 so as to block this rod in the first part 711 of the sleeve 710, namely the part of this sleeve that has the greater diameter.

The first cone point set screw 720 gets screwed into the first threaded part 711 of the sleeve 710. This screw is preferably calibrated by means of a spring 721 and is used to block the rotation of the threaded rod 302 around its horizontal axis 301 during the polymerization operations. For, when the jaw 310 of the gripping device 300 solidly grips the tube 121 of the joining piece 120 of the light guide 110, the knob 320 presses against the sliding tube 305 and therefore can no longer rotate about the threaded rod 302. It is then necessary to block the rotation of the threaded rod 302 in the sleeve 710 to enable the blocking of the rotation of the gripping means 300 about the axis 301. For this purpose, the first cone point set screw enables the application of a pressure to the shim 308 of the rod 302 in order to block it in its housing and prevent its rotation. In this way, the threaded rod 302 and the gripping means 300 are fixedly attached to the cone point set screw 720. The cone point set screw 720 is calibrated by means of a spring 721 in order to be able to adjust the pressure exerted on the shim 308 provided at the end of the threaded rod 302.

The second cone point set screw 730, advantageously located at the top of the upright 200 and above the second part 712 of the sleeve 710, namely the part of this sleeve 710 that has the smaller diameter, prevents the translation of the block formed by the gripping means 300 of the joining piece 120, the threaded rod 302 and the adjustment means 700. Furthermore, it advantageously contributes to the adjustment of the length of the axis 301 of the threaded rod 302 supporting the gripping means 300.

FIG. 3 also shows a hole 210 made in the median part of the upright. The utility of this hole is explained hereinafter.

FIG. 4a shows a view in profile of a swivelling support 600 placed on the median part of the upright 200 of a device according to the invention.

This support has a reclining U-shaped part 610, a shim 630, a spring 640 and the gripping system 800 capable of holding a connector in an immobile state. The U-shaped part 610 has a hole 615 on each of the parallel arms $B_1$, $B_2$ of the U so that the upright 200 is introduced therein. The shim 630 also has a hole 635 so that the upright 200 is introduced therein. Furthermore, it is held stable on the upright between the two parallel arms $B_1$ and $B_2$ of the U-shaped part 610 by means of the spring 640 exerting a pull-back force between itself and the lower arm $B_2$ of the U-shaped part. The upper arm $B_1$ of the U-shaped part 610 rests on the shim 630.

Advantageously, toes 650 are positioned on the upright 200 and above the shim 630. The toes 650 are for example two in number. They are made by means of a small rod 651 as shown in FIG. 4a. This small rod is placed for example in the hole 210 made in the upright 200 as shown in FIG. 3. The rod then emerges from each side of the hole 210 to form the toes 650. Hollows 660 are then made on the internal face of the upper arm $B_1$ of the U-shaped part 610, namely on the face that is placed before the shim 630 so that they receive the toes 650.

The toes define the particular positions that can be taken by the swivelling support 600 around the axis 201 of the upright 200. By leaning on the lower arm $B_2$ of the U-shaped part 610 and consequently on the spring 640, the upper arm $B_1$ of the U-shaped part 610 rises with respect to the shim so as to release the toes from their hollows. It is then possible to make the support 600 rotate until another toe 650 gets housed in a hollow 660 thus defining another stable position that can be taken by the support.

According to one variant, it is possible however to replace the system of toes and hollows by a ball bearing. However, in this case, there cannot be any defined positions of the support.

The fastening system 800, capable of holding a connector in an immobile state during the rear polymerization stage, is fixed to the base of the U-shaped part 610, namely to the arm located between the two parallel arms, the lower arm B2 and the upper arm B1. Its fastening is achieved by screwing on a screw thread 810 or by soldering or bonding for example.

A hole 820 is made on the base of the U-shaped part 610 and in the extension of a hole made in the fastening system 800 in order to receive the front of the connector during the rear polymerization phase.

FIG. 4b shows a front view of the swivelling support 600, namely a view of the base of the U-shaped part 610 to which the fastening system 800 is fixed. As described here above, the fastening system 800 advantageously has a screw thread 810 to which the connector may be screwed. In the example of FIG. 4b, the fastening system 800 is detachable and is fixed to the support 600 by means of a diametrically opposite screw 670. In one alternative embodiment, this system may be bonded or soldered but, in this case, it is not detachable.

FIG. 4c shows a top view of the swivelling support 600. In this example, the hollows 660 are advantageously four in number forming two pairs of opposite hollows. There are two toes. These toes are diametrically opposite to each other. Consequently, the number of defined positions of the swivelling support is equal to four.

Furthermore, the upper and lower arms of the U-shaped part 610 are advantageously bevelled 611, on the side opposite the base of the "U" supporting the fastening system 800, so as to eliminate all the projecting corners that could injure an operator.

Figure 5:
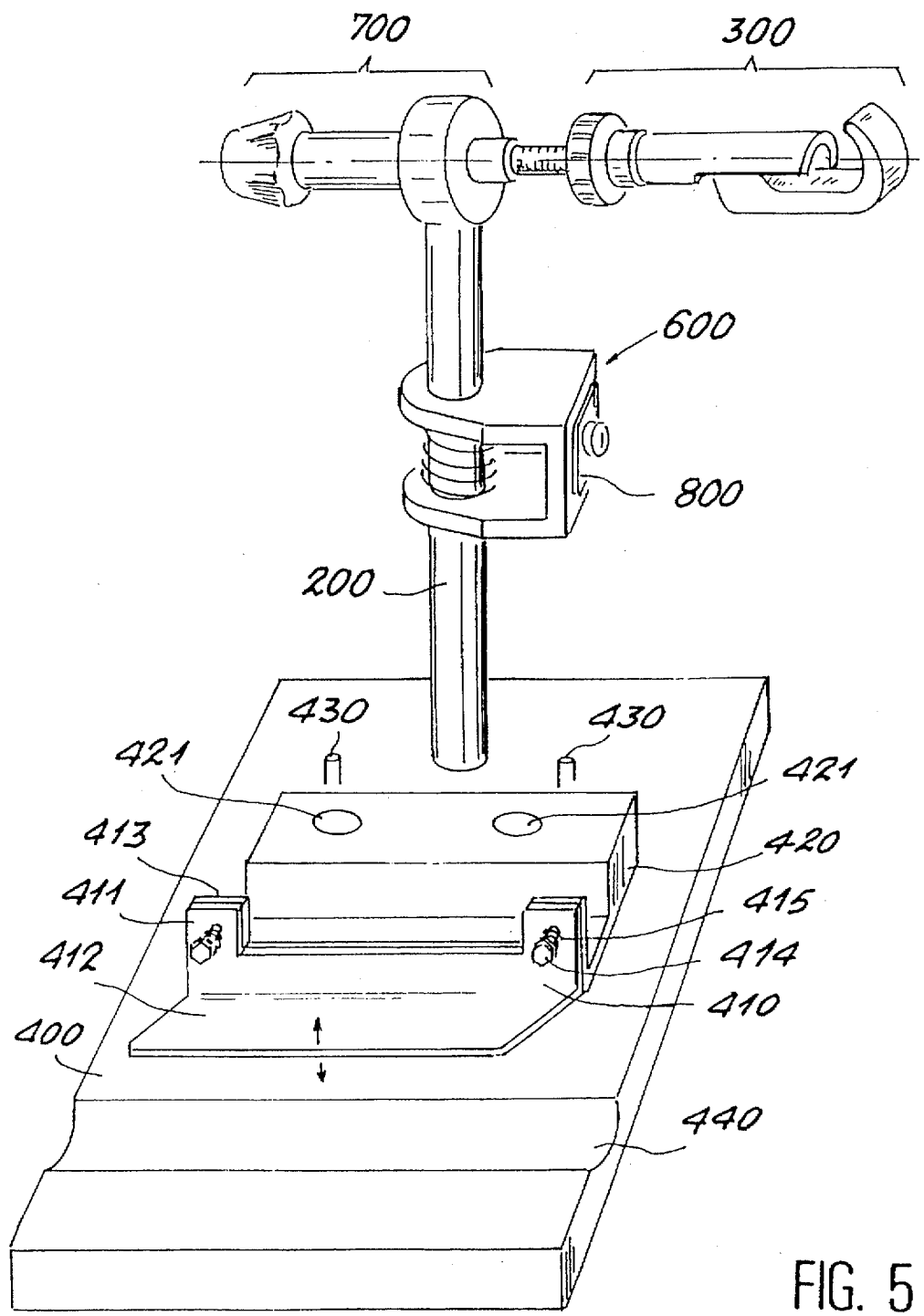

FIG. 5 shows a view in perspective of another embodiment of a device according to the invention. According to this embodiment, the lower part of the upright 200 is fixed to a horizontal working plate 400. The fastening of the upright 200 to this plate is achieved for example by means of a screw, not shown in FIG. 5, placed beneath the plate and leading into the lower, threaded part of the upright 200. In this case, the upright is detachable since it can be unscrewed from the plate.

An alternative embodiment consists in soldering the lower part of the upright 200 to the plate 400. However, in this case, the upright is constantly fixed to the plate. It is not detachable.

Advantageously, the plate 400 has a fiber-clamp system 410, a block of foam material 420, two rods 430 placed in the rear of the block of foam material and a groove 440.

The fiber-clamp system 410 is fixed to the plate 400 for example by bonding or soldering.

This system has a mobile part 411 attached to another fixed part 413 by means of two screws 414 placed at the upper ends of the two parts. The two parts are preferably U-shaped and make it possible to hold an optical fiber in a housing created between the two lower parts. The mobile part comprises a slightly curved horizontal part 412. This curved part 412 is very useful for positioning an optical fiber in the fiber clamp system or removing it therefrom. Indeed, by simple pressure on the curved part 412, the mobile part moves away from the fixed part thus enlarging the housing designed for the fiber so that this fiber can be easily placed or removed. However, to avoid breaking the optical fiber, a spring 415 is placed on each of the screws 414 for the clamping of the mobile part 411 and the fixed part 413 in order to enable an adjustment of the pressure exerted by the two parts 411 and 413 on the optical fiber.

The block of foam material 420 is made out of a foam material that is preferably rigid such as a polyurethane foam for example. One or more housings 421 are made in this block of foam material 420 to enable the holding of one or more tubes of resin.

The two rods 430 positioned on the plate 400 and behind the block of foam material enable the creation of a housing so that an alumina plate can be housed therein. This alumina plate is useful to cut off an excess of optical fiber going beyond the connector after the stage for the front polymerization of a connection system.

The groove 440 is used to lay down the equipment, such as the connectors for example, that is essential to the making of a connection system.

The plate 400 is therefore used to combine all the equipment needed to make the connection systems and to work cleanly without disorder.

Finally, the upright 200, the gripping mechanism 300, the adjustment mechanism 700, the swivelling support 600, the plate 400, the fiber-clamp system 410 and the rods 430 are advantageously made of a resistant material such as stainless steel for example.

What is claimed is:

1. A device for connecting a connector to an optical fiber by polymerization of solder on front and back faces of the connector, said device comprising:

a light source, a flexible light guide which is connected to said light source, a joining piece which is operatively connected to said flexible light guide, said joining piece having a rigid tube and a head in which is provided a hole for receiving a front face of the connector, a holder which is configured to selectively hold the connector in an immobile state in a first position in which said front face is received in said hole in said joining piece;

an upright support, a gripping mechanism which is mounted on said upright support and which grips the joining piece, a fastening system having a hole formed therein, wherein said fastening system is configured to selectively hold the connector in an immobile state in a second position in which the rear face of the connector is aligned with the hole in the fastening system, and an adjustment mechanism which is capable of causing pivoting and translation of the gripping mechanism so that the head of the joining piece can selectively move to a position in which said light guide, said hole in said joining piece, and said hole in said fastening system are in alignment.

2. A device according to claim 1, wherein the gripping mechanism is connected to said upright support by a threaded rod which is perpendicular to said upright support, and wherein said gripping mechanism comprises a jaw which is capable of receiving the joining piece and which is formed by a hook and a sliding tube fixedly joined to a knob mounted on the threaded rod.

3. A device according to claim 1, wherein the holder comprises 1) a jaw which is placed at one end of a rigid rod and which is capable of gripping the rigid tube of the joining piece, and 2) a hook which is placed at another end of the rod and which is capable of supporting the connector and of holding the connector immobile in the hole of the head of the joining piece.

4. A device according to claim 1, wherein the fastening system comprises a screw thread onto which the connector gets screwed.

5. A device according to claim 1, wherein the adjustment mechanism comprises a sleeve divided into first and second parts, the first part being threaded and having a diameter greater than that of the second part, the first part being capable of receiving, at a first end thereof, a cone point set screw and, at a second end thereof, a threaded rod supporting the gripping mechanism in order to fixedly join the threaded rod and the gripping mechanism to the cone point set screw by pressure of a cone point of the set screw on an end of the rod, a second cone point set screw located above the second part of the sleeve, said second cone point set screw selectively preventing translation of the gripping mechanism, the threaded rod, and the adjustment mechanism.

6. A device according to claim 1, further comprising a swivelling support capable of bearing the fastening system.

7. A device according to claim 6, wherein the swivelling support comprises a part with the shape of a reclining "U" having 1) a base, 2) upper and lower parallel arms, and 3) a hole on each of two parallel arms with the upright support introduced therein, a shim held in a stable state on the upright support between the two parallel arms of the "U" shaped part by a spring exerting a pull-back force between itself and the lower arm of the U-shaped part, the upper arm of the U-shaped part resting on the shim, wherein the fastening system is fixed to the base of the "U" shaped part.

8. A device according to claim 6, wherein the swivelling support is located in a median part of a longitudinal axis of the upright support.

9. A device according to claim 7, wherein a hollow is made on an internal face of the upper arm of the "U" shaped part, said hollow being capable of receiving a toe provided on the upright support and located just above the position of the shim in order to define at least one particular position of the swivelling support around a longitudinal axis of the upright support.

10. A device according to claim 7, wherein the swivelling support further comprises a ball bearing positioned between the shim and the upper arm of the "U" shaped part in order to facilitate its rotation around a longitudinal axis of the upright support.

11. A device according to claim 1, wherein the gripping mechanism and the adjustment mechanism are located on an upper part of the upright support and are borne by a threaded rod which is mounted on the upright support and whose axis is perpendicular to a longitudinal axis of the upright support.

12. A device according to claim 1, wherein a lower part of the upright support is fixed to a horizontal plate.

13. A device according to claim 1, wherein a fiber-clamp system is fixed to a plate and wherein the fiber-clamp system comprises a mobile part attached to another part fixed by two screws placed on the top ends of the mobile and fixed parts.

14. A device according to claim 13, wherein the plate has a groove formed therein.

15. A device according to claim 13, wherein the plate further comprises a block of foam in which there is formed at least one housing in order to house at least one resin tube therein.

16. A device according to claim 15, wherein two housings are placed in the plate in the rear of the block of foam.

17. A device according to claim 1, wherein the device is made of stainless steel.

18. A device for connecting a connector to an optical fiber by polymerization of solder on front and rear faces of the connector, said device including:

an upright support;

a light source;

a flexible light guide which is connected to said light source;

a joining piece which is operatively connected to said light source by said flexible light guide, said joining piece including a head having a hole formed therein;

a holder which is mounted on said joining piece and which is configured to selectively hold the connector immobile in a first position in which the front face of the connector is positioned within said hole in said head of said joining piece and can be illuminated by light travelling from said light guide and into said hole in said joining piece; and a fastening system which is mounted on said upright support and which has a hole formed therein, wherein said fastening system is configured to selectively hold the connector immobile in a second position in which the rear face of the connector is aligned with said hole in said fastening system; wherein said joining piece is adjustably supported on said upright support so as to be selectively movable with respect to said upright support to a moved position in which said hole in said head of said joining piece and said hole in said fastening system are aligned with one another and in which said the rear face of the connector can be illuminated by light travelling from said light source, though said hole in said head of said joining piece, and through said hole in said fastening system when the connector is held in the second position by said fastening system.

19. A device as defined in claim 18, further comprising a gripping mechanism which is mounted on said upright support and on which said joining piece is mounted; and an adjustment mechanism which is coupled to said gripping mechanism and which selectively pivots and translates said gripping mechanism to effect movement of said joining piece to said moved position.

* * * * *